United States Patent
Tseng et al.

(10) Patent No.: US 7,526,594 B2
(45) Date of Patent: Apr. 28, 2009

(54) USB DATA TRANSFER METHOD

(75) Inventors: Chun-Hua Tseng, Taipei (TW); Yu-Tin Hsu, Taipei (TW)

(73) Assignee: Via Technologies, Inc., Taipei (TW)

( * ) Notice: Subject to any disclaimer, the term of this patent is extended or adjusted under 35 U.S.C. 154(b) by 338 days.

(21) Appl. No.: 11/609,091

(22) Filed: Dec. 11, 2006

(65) Prior Publication Data

US 2007/0174533 A1    Jul. 26, 2007

(30) Foreign Application Priority Data

Jan. 20, 2006   (TW) ............... 95102188 A

(51) Int. Cl.
 G06F 13/36  (2006.01)
 G06F 13/38  (2006.01)
 G06F 13/00  (2006.01)
 G06F 13/20  (2006.01)

(52) U.S. Cl. .................. 710/310; 710/62; 710/104; 710/313

(58) Field of Classification Search .............. 710/62, 710/104, 310, 313
See application file for complete search history.

(56) References Cited

U.S. PATENT DOCUMENTS

| | | | |
|---|---|---|---|
| 6,191,713 B1 * | 2/2001 | Ellis et al. | 341/100 |
| 6,205,501 B1 * | 3/2001 | Brief et al. | 710/100 |
| 6,757,763 B1 * | 6/2004 | Preiss et al. | 710/105 |
| 6,842,797 B1 * | 1/2005 | Lawande | 710/35 |
| 7,047,347 B2 * | 5/2006 | Feng | 710/313 |

* cited by examiner

*Primary Examiner*—Paul R Myers
*Assistant Examiner*—Jeremy S Cerullo
(74) *Attorney, Agent, or Firm*—Thomas, Kayden, Horstemeyer and Risley

(57) ABSTRACT

A method of Universal Serial Bus (USB) data transfer is provided. In one embodiment, a USB device supports a bulk-only transmission mode to transfer data with a USB host, and the USB device comprises a bulk endpoint buffer storing data transferred between the USB device and the USB host through a bulk endpoint of the USB device and an interrupt endpoint buffer storing data transferred between the USB device and the USB host through an interrupt endpoint of the USB device. A first portion of data stipulated to be transferred through the bulk endpoint is stored with the interrupt endpoint buffer. A data path through which data is transferred between the USB host and the USB device is switched to lead to either the bulk endpoint buffer or the interrupt endpoint buffer with a multiplexer.

19 Claims, 2 Drawing Sheets

USB DATA TRANSFER METHOD

BACKGROUND OF THE INVENTION

1. Field of the Invention

The invention relates to Universal Serial Bus (USB), and more particularly to data transfer of a USB device.

2. Description of the Related Art

USB provides connection of a computer with up to 127 peripheral devices. Current three editions of USB specification are USB 1.0, 2.0, and 3.0 respectively with bandwidths of 1.5 Mbps, 12 Mbps, and 480 Mbps. Because the advantages of USB include high bandwidth, bidirectional communication, Plug and Play (PnP), and low cost, current electronic devices, such as portable storage devices and digital video or audio devices, are commonly equipped with USB interfaces for connection with computers. For example, flash disks, digital cameras, Personal Digital Assistants, and MP3 players are conventionally equipped with USB interfaces.

The USB specification for mass storage devices includes four independent data transmission standards, the most prevalent among which comprise bulk-only and Control-Bulk-Interrupt (CBI) transmission modes. Both stipulate basic methods for transferring data between a USB host and a USB device. The bulk-only transmission mode uses only a bulk endpoint to transfer data, and the CBI transmission mode uses a control endpoint, a bulk endpoint, and an interrupt endpoint to carry out data transfer.

Data transferred between a USB host and a USB device is categorized as common data, command block wrappers (CBW), and command status wrappers (CSW). A CBW contains commands issued from the USB host to the USB device and comprises 31 bytes, with ordinarily SCSI commands stored therein. After the USB device retrieves the SCSI commands from the CBW and executes the SCSI commands, the USB device reports the execution results of the commands to the USB host with a CSW, which comprises 13 bytes. The USB host then ascertains the correctness of command execution and determines whether to continue the data transmission.

When the bulk-only transmission mode is adopted to transfer data, an ordinary USB device uses only a bulk endpoint to transfer data with the USB host. When the USB host sends data to the USB device, data is first received by the bulk endpoint and then stored in the bulk endpoint buffer. Accordingly, if data is sent from the USB device to the USB host, data to be transmitted is first stored in the bulk endpoint buffer and then sent with the bulk endpoint. Because only the bulk endpoint is used to transmit or receive common data, CBWs, and CSWs under the bulk-only transmission mode, the bulk endpoint buffer requires repeated clearance for the storage of transmitted data and received data, delaying the transmission of data and degrading the performance of the entire USB system.

BRIEF SUMMARY OF THE INVENTION

A method for Universal Serial Bus (USB) data transfer is provided. In one embodiment, the USB device supports a bulk-only transmission mode to transfer data with a USB host, and the USB device comprises a bulk endpoint buffer storing data transferred between the USB device and the USB host through a bulk endpoint of the USB device and an interrupt endpoint buffer storing data transferred between the USB device and the USB host through an interrupt endpoint of the USB device. First, a first portion of data stipulated to be transferred through the bulk endpoint is stored with the interrupt endpoint buffer. A data path through which data is transferred between the USB host and the USB device is switched to lead to either the bulk endpoint buffer or the interrupt endpoint buffer with a multiplexer.

A Universal Serial Bus (USB) device is also provided. The USB device supports a bulk-only transmission mode to transfer data with a USB host. The USB device comprises a bulk endpoint buffer, an interrupt endpoint buffer, and a multiplexer. The bulk endpoint buffer stores data transferred between the USB device and the USB host through a bulk endpoint of the USB device. The interrupt endpoint buffer stores data transferred between the USB device and the USB host through an interrupt endpoint of the USB device. The multiplexer switches a data path through which data is transferred between the USB host and the USB device to lead to either the bulk endpoint buffer or the interrupt endpoint buffer.

A method for Universal Serial Bus (USB) data transfer is also provided. In one embodiment, the USB device supports a bulk-only transmission mode to transfer data with a USB host, and the USB device comprises a bulk endpoint buffer storing data transferred between the USB device and the USB host through a bulk endpoint of the USB device and an interrupt endpoint buffer storing data transferred between the USB device and the USB host through an interrupt endpoint of the USB device. First, data transferred between the USB host and the USB device being common data, command block wrappers (CBW), or command status wrappers (CSW) is determined. Data belonging to common data is then transferred through the bulk endpoint buffer. Data belonging to CBW or CSW is then transferred through the interrupt endpoint buffer. A data path through which data is transferred between the USB host and the USB device is then switched to lead to either the bulk endpoint buffer or the interrupt endpoint buffer with a multiplexer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
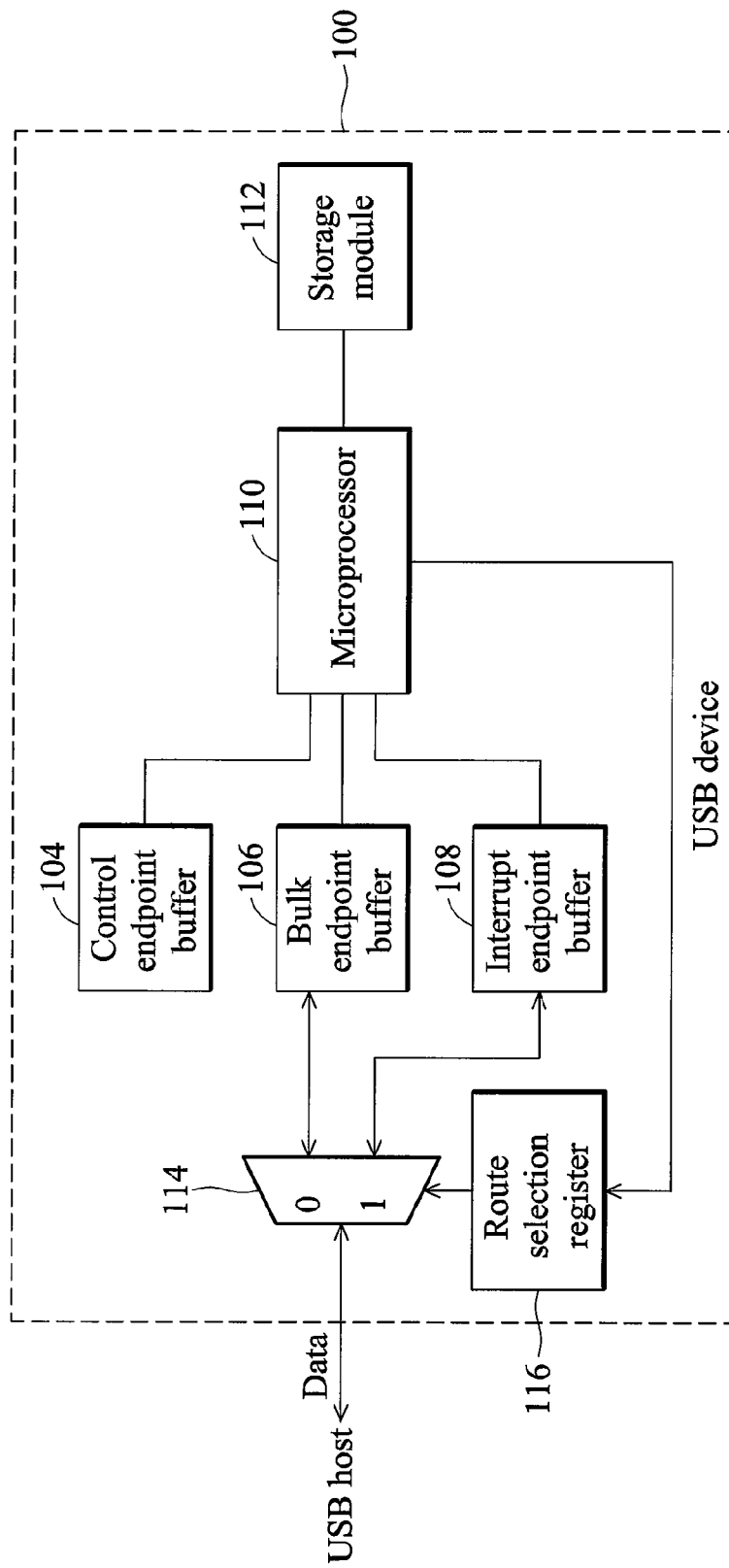
FIG. 1 is a block diagram of a USB device according to the invention.

FIG. 1 is a block diagram of a USB device 100 according to the invention. The USB device 100 supports both bulk-only and control-bulk-interrupt transmission modes and transfers data with a USB host through a control endpoint, a bulk endpoint, and an interrupt endpoint. A control endpoint buffer 104, a bulk endpoint buffer 106, and an interrupt endpoint buffer 108 of the USB device 100 respectively store data transferred through the control endpoint, the bulk endpoint, and the interrupt endpoint. The USB device 100 also includes a storage module 112 to store data and a microprocessor 110. The microprocessor 110 controls the operations of all other components of the USB device 100, such as the storage module 112, the control endpoint buffer 104, the bulk endpoint buffer 106, and the interrupt endpoint buffer 108.

Data transferred between the USB host and the USB device 100 is categorized into three categories including common data, CBW, and CSW. Unlike conventional USB devices, the USB device 100 uses both the bulk endpoint and the interrupt endpoint to transfer data with the USB host under bulk-only transmission mode. Because conventional USB devices rarely transmit data with interrupt endpoints, USB device 100 uses the interrupt endpoint to receive and parse CBW and CSW data rather than the conventional bulk endpoint. Thus, the bulk endpoint of the USB device 100 of the invention is dedicated to the processing and storing of common data, thereby reducing the frequency of repeated clearing and storing operations of the bulk endpoint buffer 106 and improving the performance of the USB device 100.

The USB device 100 further includes a multiplexer 114 and a route selection register 116. The route selection register 116 stores a route selection bit changed by the microprocessor 110. If the value of the route selection bit is 0, the multiplexer 114 switches a data path connecting the USB host and the USB device 100 to lead to the bulk endpoint buffer 106. Otherwise, if the value of the route selection bit is 1, the multiplexer 114 switches the data path connecting the USB host and the USB device 100 to lead to the interrupt endpoint buffer 108. When data is sent from the USB host to the USB device 100, the data first arrives at the multiplexer 114. The multiplexer 114 then determines whether to route data to the bulk endpoint or the interrupt endpoint according to the value of the route selection bit. After data is received by the bulk endpoint or the interrupt endpoint, the bulk endpoint and the interrupt endpoint respectively store data in the bulk endpoint buffer 106 and the interrupt endpoint buffer 108. If the USB device 100 is to send data to the USB host, data is first stored in the bulk endpoint buffer 106 and the interrupt endpoint buffer 108 according to the data category, and the bulk endpoint or the interrupt endpoint then sends data to the USB host. In one embodiment, the route selection register 116 is a bit of a memory controlled by the microprocessor 110.

Figure 2:
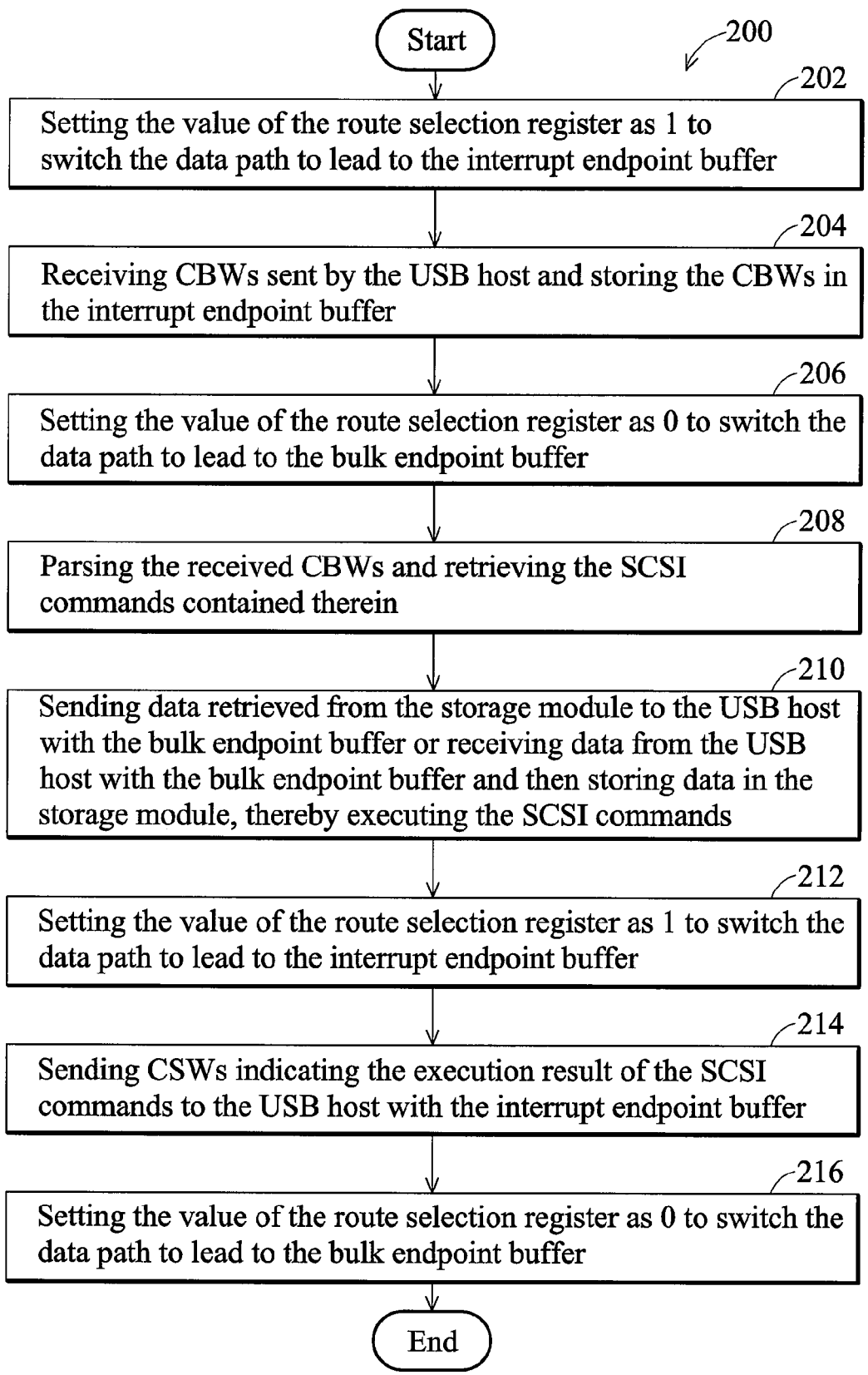
FIG. 2 shows a method for USB device data transfer with a USB host according to the invention.

FIG. 2 shows a method 200 of the USB device 100 transferring data with a USB host according to the invention. First, the microprocessor 110 sets the value of the route selection bit stored in the route selection register 116 to 1 at step 202, thereby instructing the multiplexer 114 to switch the data path to lead to the interrupt endpoint buffer 108. When the USB host sends a CBW to the USB device 100, the CBW is thus received and stored in the interrupt endpoint buffer 108 at step 204. After the CBW stored in the interrupt endpoint buffer is received, the microprocessor 110 sets the value of the route selection bit stored in the route selection register 116 to 0 at step 206, thereby instructing the multiplexer 114 to switch the data path to lead to the bulk endpoint buffer 106.

The microprocessor 110 then parses the CBW stored in the interrupt endpoint buffer 108 and retrieves the SCSI commands contained in the CBW at step 208. If the SCSI command requests specific data, the microprocessor 110 retrieves the specific data from the storage module 112 and stores the specific data in the bulk endpoint buffer 106. Because the route selection bit is 0, the data path leads to the bulk endpoint buffer 106, and the specific data requested by the USB host is transmitted to the USB host through the bulk endpoint at step 210. Otherwise, if the SCSI command indicating that the USB host intends to write specific data to the USB device 100, the USB device 100 starts to receive the specific data from the USB host. Because the route selection bit is 0, the data path leads to the bulk endpoint buffer 106, and the specific data transmitted by the USB host is received with the bulk endpoint and stored in the bulk endpoint buffer 106 at step 210. The microprocessor 110 then retrieves the specific data from the bulk endpoint buffer 106 and stores the specific data in the storage module 112.

The microprocessor 110 then sets the value of the route selection bit stored in the route selection register 116 to 1 at step 212, thereby instructing the multiplexer 114 to switch the data path to lead to the interrupt endpoint buffer 108. Because the USB device 100 has executed the CBW received at step 206, the USB device 100 sends an execution result for the CBW to the USB host with a CSW. The microprocessor 110 then writes the CSW into the interrupt endpoint buffer 108, and the CSW is transmitted to the USB host at step 214 with the interrupt endpoint. Finally, the microprocessor 110 sets the value of the route selection bit stored in the route selection register 116 to 0 at step 216, thereby instructing the multiplexer 114 to switch the data path to lead to the bulk endpoint buffer 106. The process of steps 202-216 is recursively executed to implement the data transfer between the USB device 100 and the USB host.

When the value of the route selection bit stored in the route selection register 116 is 1, the data path leads to the interrupt endpoint buffer 108, and the USB device 100 parses a CBW or a CSW stored in the interrupt endpoint buffer 108. Because the interrupt endpoint buffer 108 is originally used to handle an interrupt command issued by the USB host according to the USB specification for bulk-only transmission mode, if the USB host sends an interrupt command when the USB device 100 parses a CBW or a CSW stored in the interrupt endpoint buffer 108, the interrupt endpoint buffer 108 is required by both the interrupt command and the data of CBW or CSW at the same time. The problem can be solved by handling the interrupt command at a prior order. The data originally stored in the interrupt endpoint buffer 108 can first be moved to clear the interrupt endpoint buffer 108 for the storage of the interrupt command. After the interrupt command is processed and deleted, the original data of CBW or CSW is restored to the interrupt endpoint buffer 108 for further processing. Another solution comprises handling the interrupt command at an inferior order. The interrupt command issued by the USB host is first stored elsewhere when the original data of CBW or CSW stored in the interrupt endpoint buffer 108 is processed. After the original data is processed and deleted, the interrupt command is moved to the interrupt endpoint buffer for further processing.

The USB device provided by the invention uses an interrupt endpoint buffer to manage CBW and CSW data. Thus, the bulk endpoint buffer is not required to frequently clear and move the data stored therein and is dedicated to the transmission of common data. The data transmission bandwidth of the USB device is thus increased, and the performance of the USB device is improved.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for Universal Serial Bus (USB) data transfer, wherein a USB device supports a bulk-only transmission mode to transfer data with a USB host, and the USB device comprises a bulk endpoint buffer storing data transferred between the USB device and the USB host through a bulk endpoint of the USB device and an interrupt endpoint buffer storing data transferred between the USB device and the USB host through an interrupt endpoint of the USB device, the method comprising:

storing a first portion of data stipulated to be transferred through the bulk endpoint with the interrupt endpoint buffer; and switching a data path through which data is transferred between the USB host and the USB device to lead to either the bulk endpoint buffer or the interrupt endpoint buffer with a multiplexer.

2. The method as claimed in claim 1, wherein data transferred between the USB host and USB device includes common data, command block wrappers (CBW), and command status wrappers (CSW), and the first portion of data is CSW and CBW.

3. The method as claimed in claim 2, wherein switching of the data path further comprises:

adjusting the multiplexer to switch the path to lead to the bulk endpoint buffer when data transferred between the USB host and the USB device is common data; and adjusting the multiplexer to switch the path to lead to the interrupt endpoint buffer when data transferred between the USB host and the USB device is CSW or CBW.

4. The method as claimed in claim 1, wherein switching of the data path is determined by a route selection bit.

5. The method as claimed in claim 1, wherein the method further comprises:

clearing the interrupt endpoint buffer to store an interrupt command issued by the USB host after the first portion of data originally stored in the interrupt endpoint buffer is moved elsewhere when the USB device receives the interrupt command; and restoring the first portion of data to the interrupt endpoint buffer for further processing after the interrupt command is processed and deleted.

6. The method as claimed in claim 1, wherein the method further comprises:

storing an interrupt command issued by the USB host elsewhere when the USB device receives the interrupt command; and moving the interrupt command to the interrupt endpoint buffer for further processing after the first portion of data originally stored in the interrupt endpoint buffer is processed and deleted.

7. A Universal Serial Bus (USB) device, supporting a bulk-only transmission mode to transfer data with a USB host, comprising:

a bulk endpoint buffer, storing data transferred between the USB device and the USB host through a bulk endpoint of the USB device;

an interrupt endpoint buffer, storing data transferred between the USB device and the USB host through an interrupt endpoint of the USB device; and a multiplexer, coupled to the bulk endpoint buffer and the interrupt endpoint buffer, switching a data path through which data is transferred between the USB host and the USB device to lead to either the bulk endpoint buffer or the interrupt endpoint buffer.

8. The USB device as claimed in claim 7, wherein the USB device further comprises a microprocessor, coupled to the bulk endpoint buffer and the interrupt endpoint buffer, controlling the multiplexer to route a first portion of data stipulated to be transferred through the bulk endpoint to the interrupt endpoint buffer with the data path, thereby storing the first portion of data in the interrupt endpoint buffer.

9. The USB device as claimed in claim 8, wherein data transferred between the USB host and USB device includes common data, command block wrappers (CBW), and command status wrappers (CSW), and the first portion of data is CSW and CBW.

10. The USB device as claimed in claim 9, wherein the microprocessor adjusts the multiplexer to switch the path to lead to the bulk endpoint when data transferred between the USB host and the USB device is common data, and the microprocessor adjusts the multiplexer to switch the path to lead to the interrupt endpoint when data transferred between the USB host and the USB device is CSW or CBW.

11. The USB device as claimed in claim 8, wherein the USB device further comprises a route selection register, storing a route selection bit determining whether the multiplexer switches the data path to lead to the bulk endpoint buffer or the interrupt endpoint buffer, and the route selection bit is changed by the microprocessor.

12. The USB device as claimed in claim 8, wherein the USB device further comprises a storage module, coupled to the microprocessor, storing data.

13. The USB device as claimed in claim 8, wherein the microprocessor moves the first portion of data originally stored in the interrupt endpoint buffer elsewhere when the USB device receives an interrupt command issued by the USB host, the microprocessor then clears the interrupt endpoint buffer to store the interrupt command after, and the microprocessor then restores the first portion of data to the interrupt endpoint buffer for further processing after the interrupt command is processed and deleted.

14. The USB device as claimed in claim 8, wherein the microprocessor stores an interrupt command issued by the USB host elsewhere when the USB device receives the interrupt command and moves the interrupt command to the interrupt endpoint buffer for further processing after the first portion of data originally stored in the interrupt endpoint buffer is processed and deleted.

15. A method for Universal Serial Bus (USB) data transfer, wherein a USB device supports a bulk-only transmission mode to transfer data with a USB host, and the USB device comprises a bulk endpoint buffer storing data transferred between the USB device and the USB host through a bulk endpoint of the USB device and an interrupt endpoint buffer storing data transferred between the USB device and the USB host through an interrupt endpoint of the USB device, the method comprising:

identifying whether data transferred between the USB host and the USB device is common data, command block wrappers (CBW), or command status wrappers (CSW);

transferring common data through the bulk endpoint buffer;

transferring CBW or CSW data through the interrupt endpoint buffer; and switching a data path through which data is transferred between the USB host and the USB device to lead to either the bulk endpoint buffer or the interrupt endpoint buffer with a multiplexer.

16. The method as claimed in claim 15, wherein switching of the data path is determined by a route selection bit.

17. The method as claimed in claim 15, wherein the switching of the data path further comprises:

adjusting the multiplexer to switch the path to lead to the bulk endpoint buffer when data transferred between the USB host and the USB device is common data; and adjusting the multiplexer to switch the path to lead to the interrupt endpoint buffer when data transferred between the USB host and the USB device is CSW or CBW.

18. The method as claimed in claim 15, wherein the method further comprises:

clearing the interrupt endpoint buffer to store an interrupt command issued by the USB host after the first portion of data originally stored in the interrupt endpoint buffer is moved elsewhere when the USB device receives the interrupt command; and restoring the first portion of data to the interrupt endpoint buffer for further processing after the interrupt command is processed and deleted.

19. The method as claimed in claim 15, wherein the method further comprises:

storing an interrupt command issued by the USB host elsewhere when the USB device receives the interrupt command; and moving the interrupt command to the interrupt endpoint buffer for further processing after the first portion of data originally stored in the interrupt endpoint buffer is processed and deleted.

* * * * *